United States Patent [19]

Jung et al.

[11] Patent Number: 4,655,958

[45] Date of Patent: Apr. 7, 1987

[54] LIQUID-WATER DISPLACEMENT COMPOSITION OF A CHLOROFLUOROCARBON COMPOUND AND A PHOSPHATE SALT SURFACTANT

[75] Inventors: Alfred K. Jung, Millwood; Edward D. Weil, Hastings-on-Hudson, both of N.Y.

[73] Assignee: Stauffer Chemical Company, Westport, Conn.

[21] Appl. No.: 817,764

[22] Filed: Jan. 7, 1986

Related U.S. Application Data

[63] Continuation of Ser. No. 670,445, Nov. 13, 1984.

[51] Int. Cl.[4] .............................................. C09K 3/00

[52] U.S. Cl. .................................... 252/194; 252/153; 252/545; 148/6.15 R

[58] Field of Search ................. 252/68, 153, 545, 194, 252/DIG. 17; 106/14.42; 148/6.15 R

[56] References Cited

U.S. PATENT DOCUMENTS

| | | | |
|---|---|---|---|
| 3,352,790 | 11/1967 | Sugarman et al. | 252/153 X |
| 3,397,150 | 8/1968 | Burt et al. | 252/153 X |
| 3,482,928 | 12/1969 | Knieriem, Jr. | 252/153 X |
| 4,124,517 | 11/1978 | Hisamoto et al. | 252/153 X |
| 4,191,666 | 4/1980 | Chabert et al. | 252/545 |
| 4,491,531 | 1/1985 | Bargigia et al. | 252/153 |
| 4,539,134 | 9/1985 | Martin et al. | 252/DIG. 17 |
| 4,594,177 | 6/1986 | Lantz et al. | 252/194 |

*Primary Examiner*—John F. Terapane
*Assistant Examiner*—Matthew A. Thexton
*Attorney, Agent, or Firm*—Richard P. Fennelly

[57] ABSTRACT

Liquid-water displacement compositions containing a normally liquid chlorofluorocarbon compound with a surfactant comprising a tetraalkyl ammonium compound derived from an aryl acid phosphate are described. They are useful in aiding in the substantially complete removal of water from the surface of metals.

4 Claims, No Drawings

LIQUID-WATER DISPLACEMENT COMPOSITION OF A CHLOROFLUOROCARBON COMPOUND AND A PHOSPHATE SALT SURFACTANT

This is a continuation, of application Ser. No. 670,445 filed Nov. 13, 1984.

BACKGROUND OF THE INVENTION

1. Field of the Invention

The present invention is directed to liquid-water displacement compositions containing a normally liquid chlorofluorocarbon compound with a surfactant comprising a tetraalkyl ammonium compound derived from an aryl acid phosphate.

2. Description of the Prior Art

The prior art has described various compositions for treating the surface of metal parts, for example, in order to displace water therefrom. It is of value in many machining and cleaning operations that metal parts be brought into contact with water with the result that the finished metal surface will become wet. In order to prevent such problems as corrosion, the prior art has proposed using liquid-water displacement compositions containing liquid chlorofluorocarbon compounds with certain surfactants which impart water displacement characteristics to such compositions. For example, U.S. Pat. No. 3,397,150 to J. G. Burt et al. describes a composition containing a trichlorotrifluoroethane compound with a surfactant derived from a monoalkyl or a dialkyl phosphate ester containing alkyl groups and a saturated aliphatic amine. More recently, U.S. Pat. No. 4,182,687 to P. L. Bartlett describes a liquid water displacement composition containing a normally liquid chlorofluorocarbon with a surfactant that contains a tetraalkyl ammonium cation moiety. One of the possible anionic moieties for the surfactant can be certain types of $C_1$–$C_{18}$ alkyl groups.

SUMMARY OF THE PRESENT INVENTION

A liquid water-displacement composition is described herein which contains a normally liquid chlorofluorocarbon compound in combination with a tetraalkyl ammonium surfactant compound which is derived by forming the tetraalkyl ammonium salt of an aryl acid phosphate. For purposes of the present invention, the terminology "aryl acid phosphate" shall be used to generically cover and designate both the orthophosphate as well as the pyrophosphate species (as well as mixtures containing such compounds).

DETAILED DESCRIPTION OF THE PRESENT INVENTION

The normally liquid chlorofluorocarbon compound which forms one part of the present invention is of the general type described in recent U.S. Pat. No. 4,182,687 to P. L. Bartlett, which is mentioned above. The term "normally liquid chlorofluorocarbon" is meant to mean a chlorofluorocarbon that is liquid at ambient temperatures of 20°–25° C. and one atmosphere of pressure. Such normally liquid chlorofluorocarbon compounds preferably have at least two carbon atoms, have a boiling point of at least about 28° C., have a density of at least about 1.3 grams/cc at 20° C. and a solubility parameter of less than about 18 as calculated by the equation shown in the above-mentioned U.S. Pat. No. 4,182,687, which is incorporated herein by reference.

Examples of suitable normally liquid chlorofluorocarbon compounds which can be used include 1,1-dichloro-2,2,2-trifluoroethane; 1,2-dichloro-1,1-dichloroethane; and 1,1,2-trichloro-1,2,2-trifluoroethane. Others would be known to the person of ordinary skill in the art.

The second essential component of the compositions of the present invention is a tetraalkyl ammonium salt of an aryl acid orthophosphate, polyphosphate, or mixture thereof. Preferably, the tetraalkyl ammonium moiety which is the cation for the surfactant has either two or three $C_6$–$C_{18}$ alkyl groups and either one or two $C_1$–$C_2$ alkyl groups. The aryl acid orthophosphate, and/or polyphosphate moiety for the surfactant can be either of the compounds of the following structural formulae (or mixtures thereof), where R in the formulae is either an aryl group or an alkyl substituted aryl group, e.g., a $C_1$–$C_{18}$ alkylaryl substituent having from 1 to 2 alkyl substituents of 1 to 12 carbon atoms on the phenyl group:

$$(RO)(OH)P(O)OP(O)(OR)_2$$
$$(RO)(OH)P(O)OP(O)(OR)(OH)$$
$$(RO)(OH)P(O)OP(O)(OH)_2$$
$$(RO)(OH)P(O)(OR) \quad (RO)P(O)(OH)_2$$

A representative compound of this invention is the mixed mono/di-(octylphenyl)acid orthophosphate made from about three moles of octylphenol and one mole of $P_2O_5$.

Generally speaking, when a pyrophosphate solution is used, it will normally contain the three of the —P(O)OP(O)— structures. Generally, about 80% or so of this composition will be the di(hydroxyaryl)pyrophosphate, with the remainder comprising a predominant amount of the tri(hydroxyaryl)pyrophosphate compound and a much smaller amount of the monohydroxy species. When an aryl acid orthophosphate composition is used (i.e., the last two formulae, above), such a composition will generally comprise a mixture of a predominant amount (70%–80%) of the di(hydroxyaryl)acid orthophosphate, with the remainder being the monohydroxy species. Of course, mixtures of the various pyro- and orthophosphate compounds shown above can be used as material to furnish the anionic portion to the surfactant of the present invention.

The tetraalkylammonium salts of the aryl acid phosphates used with the present invention can be synthesized in the same manner as the alkyl acid phosphate salts which form a portion of the compositions described in U.S. Pat. No. 4,182,687. The amount of surfactant can range from about 0.1 to about 2.5 grams of surfactant per liter of composition.

The use of an aryl moiety in the acid phosphate component of the present invention is believed to give the composition a greater degree of solubility allowing the use of poorer solvents than would be otherwise possible. The aryl moiety is also believed to give a higher substantivity to metal to thereby aid in displacing water from the metal.

One particular problem inherent in alkyl acid phosphates and their derivatives is thermal instability. It is known from the literature that the alkyl groups can be thermally lost by elimination to form olefins. Generally this reaction can be represented as follows:

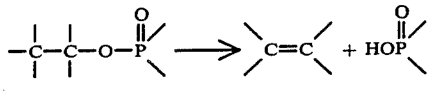

This reaction will be a cause of loss of the desired alkyl acid phosphate structures when the process of drying is applied to the objects or where the solution is kept in use for a long time. It is an object of the invention to make available quaternary ammonium acid phosphate salts which are at least equally usable for the water displacement purpose described above but which are incapable of producing this loss of active structure. This object is achieved by the method of the invention by having aryl groups bonded to the phosphorus atom, rather than alkyl groups. The analogous elimination reaction to form olefin cannot take place because it would require the formation of the very high energy "benzyne" structure:

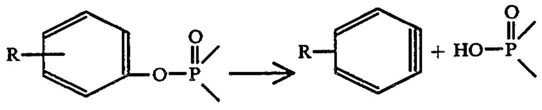

(not formed)

The compositions of the present invention are used in the same manner as the compositions described in the aforementioned U.S. Pat. No. 4,182,687. For example, in order to dry a metal part, it can be immersed in a boiling composition of this invention for a sufficient length of time (e.g., 2-10 minutes) followed by immersion in boiling liquid chlorofluorocarbon (e.g., for 1-2 minutes) to remove the composition of the invention.

Preferably, the resulting metal part can be subjected to a vapor stream of a chlorofluorocarbon to remove any residual contaminant.

The foregoing should not be construed in a limiting sense. The Claims which follow set forth the subject matter for which protection is desired.

What is claimed:

1. A liquid-water displacement composition consisting essentially of a normally liquid chlorofluorocarbon compound and, as a surfactant, a tetraalkylammonium salt of an aryl acid phosphate or alkyl substituted aryl acid phosphate wherein the tetraalkylammonium moiety has two or three $C_6$-$C_{18}$ alkyl groups and one or two $C_1$-$C_2$ alkyl groups.

2. A composition as claimed in claim 1 wherein the chlorofluorocarbon compound has at least two carbon atoms and a boiling point of at least 28° C.

3. A composition as claimed in claim 1 wherein the aryl acid phosphate is at least one of the following orthophosphates:

$$(RO)(OH)P(O)OR \quad (RO)P(O)(OH)_2$$

with R being aryl or alkyl substituted aryl.

4. A composition as claimed in claim 1 wherein the aryl acid phosphate is at least one of following pyrophosphates:

$$(RO)(OH)P(O)OP(O)(OR)_2$$

$$(RO)(OH)P(O)OP(O)(OR)(OH)$$

$$(RO)(OH)P(O)OP(O)(OH)_2$$

with R being aryl or alkyl substituted aryl.

* * * * *